(12) United States Patent
Chen

(10) Patent No.: US 9,445,265 B2
(45) Date of Patent: Sep. 13, 2016

(54) METHOD AND DEVICE FOR PROCESSING SRVCC SWITCHING, AND TERMINAL

(75) Inventor: Yang Chen, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 154 days.

(21) Appl. No.: 14/368,328

(22) PCT Filed: Jun. 29, 2012

(86) PCT No.: PCT/CN2012/077940
§ 371 (c)(1),
(2), (4) Date: Jul. 9, 2014

(87) PCT Pub. No.: WO2013/078858
PCT Pub. Date: Jun. 6, 2013

(65) Prior Publication Data
US 2015/0010154 A1 Jan. 8, 2015

(30) Foreign Application Priority Data

Nov. 29, 2011 (CN) .......................... 2011 1 0387451

(51) Int. Cl.
*H04L 9/06* (2006.01)
*H04L 9/08* (2006.01)
(Continued)

(52) U.S. Cl.
CPC ............ *H04W 12/04* (2013.01); *H04L 9/0618* (2013.01); *H04L 9/0861* (2013.01);
(Continued)

(58) Field of Classification Search
CPC ... H04W 12/04; H04W 12/06; H04W 36/14; H04W 12/02; H04W 12/10; H04W 36/0022; H04W 84/042; H04L 9/0618; H04L 9/0861
See application file for complete search history.

(56) References Cited

U.S. PATENT DOCUMENTS 8,665,823 B2 * 3/2014 Hwang .................. H04W 8/12
370/331
8,724,586 B2 * 5/2014 Hallenstal ......... H04W 36/0022
370/331

(Continued)

FOREIGN PATENT DOCUMENTS

CN 101895883 A 11/2010
CN 101977372 A 2/2011

(Continued)

OTHER PUBLICATIONS

International Search Report in international application No. PCT/CN2012/077940, mailed on Oct. 18, 2012.

(Continued)

*Primary Examiner* — Jung Kim
*Assistant Examiner* — James J Wilcox
(74) *Attorney, Agent, or Firm* — Oppedahl Patent Law Firm LLC

(57) ABSTRACT

A method and device for processing Single Radio Voice Call Continuity (SRVCC) switching, and a related terminal are disclosed. In a technical solution of the disclosure, two sets of authentication parameters can be stored during the process of SRVCC switching, one set of which is stored into a card and the other set is stored into a temporary data area, and specific access to the authentication parameters is controlled by a switch variable so that a user does not need to consider using which data area. It is determined, after the SRVCC switching succeeds or fails, whether authentication parameters in the temporary data area need to be written into the card. Calculated authentication parameters are directly written into the card after the SRVCC switching is started, so that update of the authentication parameters is more flexible and signalling interaction with a network can be reduced.

9 Claims, 3 Drawing Sheets

(51) Int. Cl.
*H04W 12/04* (2009.01)
*H04W 12/06* (2009.01)
*H04W 74/00* (2009.01)
*H04W 12/08* (2009.01)
*H04W 36/14* (2009.01)
*H04W 36/00* (2009.01)
*H04W 84/04* (2009.01)
*H04W 12/02* (2009.01)
*H04W 12/10* (2009.01)

(52) U.S. Cl.
CPC .......... *H04L 9/0872* (2013.01); *H04W 12/06* (2013.01); *H04W 12/08* (2013.01); *H04W 36/14* (2013.01); *H04W 74/008* (2013.01); H04L 2209/80 (2013.01); *H04W 12/02* (2013.01); *H04W 12/10* (2013.01); *H04W 36/0022* (2013.01); *H04W 36/0038* (2013.01); *H04W 84/042* (2013.01)

(56) References Cited

U.S. PATENT DOCUMENTS

| | | | | |
|---|---|---|---|---|
| 8,730,917 | B2* | 5/2014 | Xie | H04W 36/0022 370/225 |
| 8,824,417 | B2* | 9/2014 | Keller | H04W 36/0022 370/331 |
| 8,855,023 | B2* | 10/2014 | Mutikainen | H04W 8/04 370/259 |
| 8,964,691 | B2* | 2/2015 | Chen | H04W 36/0022 370/331 |
| 2009/0270099 | A1* | 10/2009 | Gallagher | H04W 8/08 455/435.1 |
| 2011/0176680 | A1 | 7/2011 | Wu | |
| 2012/0163601 | A1 | 6/2012 | Veron | |
| 2012/0224564 | A1* | 9/2012 | Paisal | H04N 7/148 370/331 |
| 2013/0083777 | A1* | 4/2013 | Rydnell | H04W 36/0022 370/331 |
| 2013/0128865 | A1* | 5/2013 | Wu | H04W 36/00 370/331 |
| 2014/0269613 | A1* | 9/2014 | Tiwari | H04W 12/10 370/331 |
| 2014/0348129 | A1* | 11/2014 | Yang | H04W 36/0016 370/331 |
| 2015/0156681 | A1* | 6/2015 | Brombal | H04L 65/80 370/331 |
| 2015/0223121 | A1* | 8/2015 | Keller | H04W 36/0022 370/331 |
| 2015/0327127 | A1* | 11/2015 | Centonza | H04W 36/0055 455/436 |

FOREIGN PATENT DOCUMENTS

| | | |
|---|---|---|
| CN | 102158855 A | 8/2011 |
| CN | 102413467 A | 4/2012 |
| WO | 2011021091 A1 | 2/2011 |

OTHER PUBLICATIONS

English Translation of the Written Opinion of the International Search Authority in international application No. PCT/CN2012/077940, mailed on Oct. 18, 2012.
Supplementary European Search Report in European application No. 12852719.9, mailed on Sep. 10, 2015.
3GPP TSG SA3 S3 100586, Apr. 2010.

* cited by examiner

METHOD AND DEVICE FOR PROCESSING SRVCC SWITCHING, AND TERMINAL

TECHNICAL FIELD

The disclosure relates to the field of communications, and more particularly to a method and device for processing Single Radio Voice Call Continuity (SRVCC) switching, and an associated terminal.

BACKGROUND

With the continuous development of communication technologies, the technology in which it is able to make the voice service switched from a Packet Switching (PS) domain to a Circuit Switching (CS) domain appears. This technology is called SRVCC switching technology. The mode of SRVCC switching includes switching from a Time Division-Synchronization Code Division Multiple Access (TD-SCDMA) system to a TD-SCDMA system, switching from a TD-SCDMA system to a Global System for Mobile Communications (GSM) system, switching from a Long Term Evolution (LTE) system to a TD-SCDMA system, and switching from an LTE system to a GSM system. In a multi-mode system, the application of the SRVCC switching technology can greatly improve user experience.

A process of SRVCC switching is briefly described by taking SRVCC switching from an LTE system to a TD-SCDMA system for an example.

If the current system of a terminal is the LTE system, then a PS domain voice service is initiated. After the PS domain voice service is established, during the process of a call, a network side decides, due to signal quality, to carry out SRVCC switching. After resources of the network side are switched, the network side informs the terminal to switch to the TD-SCDMA system from the current LTE system. After the switching is completed, the terminal can continue to carry out the voice service under the TD-SCDMA system. During the process, other PS domain voice services may also be switched to the TD-SCDMA system for proceeding.

Due to that a voice service under an original system may be subjected to encryption and integrity protection, in order to switch the voice service to a target system from the original system successfully, original authentication parameters need to be treated such that they are applicable to the target system. During the mapping, the following problems would be involved, for example, whether to convert authentication parameters, when to start the conversion of the authentication parameters, when to store the converted authentication parameters into a card, and how to proceed the authentication parameters when the SRVCC switching fails. However, no related technology capable of solving the above problems is disclosed at present.

SUMMARY

The disclosure provides a method and device for processing SRVCC switching, and an associated terminal, which can be used to process authentication parameters during the process of SRVCC switching so that the SRVCC switching can be completed successfully without impacting a service.

To this end, a technical solution of the disclosure is implemented as follows.

A method for processing SRVCC switching includes that:

after a terminal receives an SRVCC switching command sent by a network side, the terminal determines whether a Packet Switching (PS) domain voice service under a current system of the terminal is subjected to encryption and integrity protection;

when the PS domain voice service under the current system of the terminal is subjected to encryption and integrity protection, PS domain authentication parameters in the current system are converted into Circuit Switching (CS) domain authentication parameters and PS domain authentication parameters in a target system;

the CS domain authentication parameters and the PS domain authentication parameters in the target system are stored into a temporary data area which can be accessed by a Non-Access Stratus (NAS) and an Access Stratus (AS), and a switch variable is set for the temporary data area; and when the terminal determines that the SRVCC switching succeeds, the CS domain authentication parameters and the PS domain authentication parameters in the target system stored in the temporary data area are written into a card, and the switch variable is set as reading from the card.

When the terminal is switched to from an LTE system to a Time Division-Synchronization Code Division Multiple Access (TD-SCDMA) or Global System for Mobile Communications (GSM) system by terms of an SRVCC switching mode, the step of converting PS domain authentication parameters in the current LTE system into CS domain authentication parameters and PS domain authentication parameters in the TD-SCDMA or GSM system may include that:

the card to receive an Access Security Management Entity of Key (KASME), a downlink NAS COUNT value and a Key Set Identifier for E-UTRAN (Evolved Universal Terrestrial Radio Access Network) (eKsi) in the LTE system are read;

a Universal Mobile Telecommunications System (UMTS) integrity key (IK) and a UMTS ciphering key (Ck) are calculated;

a GSM ciphering key (Kc) of 64 bits is calculated according to the calculated IK and Ck;

a Kc of 128 bits is calculated according to the calculated IK and Ck;

a NewFlag used for indicating whether the calculated keys are new keys is set as invalid; and a UMTS ciphering key sequence number (CKSN) and a GSM key set identifier (KSI) are set as the eKsi in the LTE system.

When the terminal is switched to from a TD-SCDMA system to a TD-SCDMA or GSM system by terms of an SRVCC switching mode, the step of converting PS domain authentication parameters in the current TD-SCDMA system into CS domain authentication parameters in the TD-SCDMA system or into CS domain authentication parameters and PS domain authentication parameters in the GSM system may include that:

an IK and a Ck are calculated;

a Kc of 64 bits is calculated according to the calculated IK and Ck;

a Kc of 128 bits is calculated according to the calculated IK and Ck;

a NewFlag is set as invalid; and a CKSN and a KSI are set as a PS domain KSI in the current TD-SCDMA system.

A device for processing SRVCC switching includes:

an SRVCC switching command receiving module, configured to receive an SRVCC switching command sent by a network side;

an authentication parameter conversion module, configured to: determine whether a PS domain voice service under a current system of the terminal is subjected to encryption and integrity protection, and when the PS domain voice service under the current system of the terminal is subjected to encryption and integrity protection, convert PS domain authentication parameters in the current system into CS domain authentication parameters and PS domain authentication parameters in a target system;

an authentication parameter processing module, configured to: store the CS domain authentication parameters and the PS domain authentication parameters in the target system into a temporary data area which can be accessed by an NAS and an AS, and set a switch variable for the temporary data area; and an authentication parameter writing module, configured to: when the terminal carries out SRVCC switching successfully, write, into a card, the CS domain authentication parameters and the PS domain authentication parameters in the target system stored in the temporary data area, and set the switch variable as reading from the card.

When the device is switched to from an LTE system to a TD-SCDMA or GSM system by terms of an SRVCC switching mode, the authentication parameter processing module may be further configured to:

read the card to receive a KASME, a downlink NAS COUNT value and an eKsi in the LTE system;

calculate an IK and a Ck;

calculate a Kc of 64 bits according to the calculated IK and Ck;

calculate a Kc of 128 bits according to the calculated IK and Ck;

set a NewFlag used for indicating whether the calculated keys are new keys, as invalid; and set a CKSN and a KSI as the eKsi in the LTE system.

When the device is switched to from a TD-SCDMA system to a TD-SCDMA or GSM system by terms of an SRVCC switching mode, the authentication parameter processing module may be further configured to:

calculate an IK and a Ck;

calculate a Kc of 64 bits according to the calculated IK and Ck;

calculate a Kc of 128 bits according to the calculated IK and Ck;

set a NewFlag as invalid; and set a CKSN and a KSI as a PS domain KSI in the current TD-SCDMA system.

A terminal includes a device for processing SRVCC switching, which includes:

an SRVCC switching command receiving module, configured to receive an SRVCC switching command sent by a network side;

an authentication parameter conversion module, configured to: determine whether a PS domain voice service under a current system of the terminal is subjected to encryption and integrity protection, and when the PS domain voice service under the current system of the terminal is subjected to encryption and integrity protection, convert PS domain authentication parameters in the current system into CS domain authentication parameters and PS domain authentication parameters in a target system;

an authentication parameter processing module, configured to: store the CS domain authentication parameters and the PS domain authentication parameters in the target system into a temporary data area which can be accessed by an NAS and an AS, and set a switch variable for the temporary data area; and an authentication parameter writing module, configured to: when the terminal carries out SRVCC switching successfully, write, into a card, the CS domain authentication parameters and the PS domain authentication parameters in the target system stored in the temporary data area, and set the switch variable as reading from the card.

When the terminal is switched to from an LTE system to a TD-SCDMA or GSM system by terms of an SRVCC switching mode, the authentication parameter processing module may be further configured to:

read the card to receive a KASME, a downlink NAS COUNT value and an eKsi in the LTE system;

calculate an IK and a Ck by using a formula derived key=HMAC-SHA-256 (Key, S);

calculate a Kc of 64 bits according to the calculated IK and Ck;

calculate a Kc of 128 bits according to the calculated IK and Ck;

set a NewFlag used for indicating whether the calculated keys are new keys, as invalid; and set a CKSN and a KSI as the eKsi in the LTE system.

When the terminal is switched to from a TD-SCDMA system to a TD-SCDMA or GSM system by terms of an SRVCC switching mode, the authentication parameter processing module may be further configured to:

calculate an IK and a Ck;

calculate a Kc of 64 bits according to the calculated IK and Ck;

calculate a Kc of 128 bits according to the calculated IK and Ck;

set a NewFlag as invalid; and set a CKSN and a KSI as a PS domain KSI in the current TD-SCDMA system.

It can be seen from the solution of the disclosure, compared with the existing technologies, two sets of authentication parameters can be stored during the process of SRVCC switching, one set of which is stored into a card and the other set of which is stored into a temporary data area, and access to the authentication parameters is controlled by a switch variable so that a user does not need to consider using which data area. It is determined, after the SRVCC switching succeeds or fails, whether authentication parameters in the temporary data area need to be written into the card. Calculated authentication parameters are directly written into the card after the SRVCC switching is started, so that update of the authentication parameters is more flexible and signalling interaction with a network can be reduced.

BRIEF DESCRIPTION OF THE DRAWINGS

The accompanying drawings illustrated here are intended to provide further understanding to the disclosure, and constitute a portion of the disclosure. Illustrative embodiments of the disclosure and description thereof are used to explain the disclosure instead of constituting improper restriction to the disclosure. In the accompanying drawings.

DETAILED DESCRIPTION

To make a technical problem to be solved, a technical solution, and beneficial effects of the disclosure clearer and easier to be understood, the disclosure is further elaborated below with reference to the drawings and embodiments. It should be understood that the specific embodiments described here are only intended to interpret the disclosure instead of limiting the disclosure.

Figure 1:
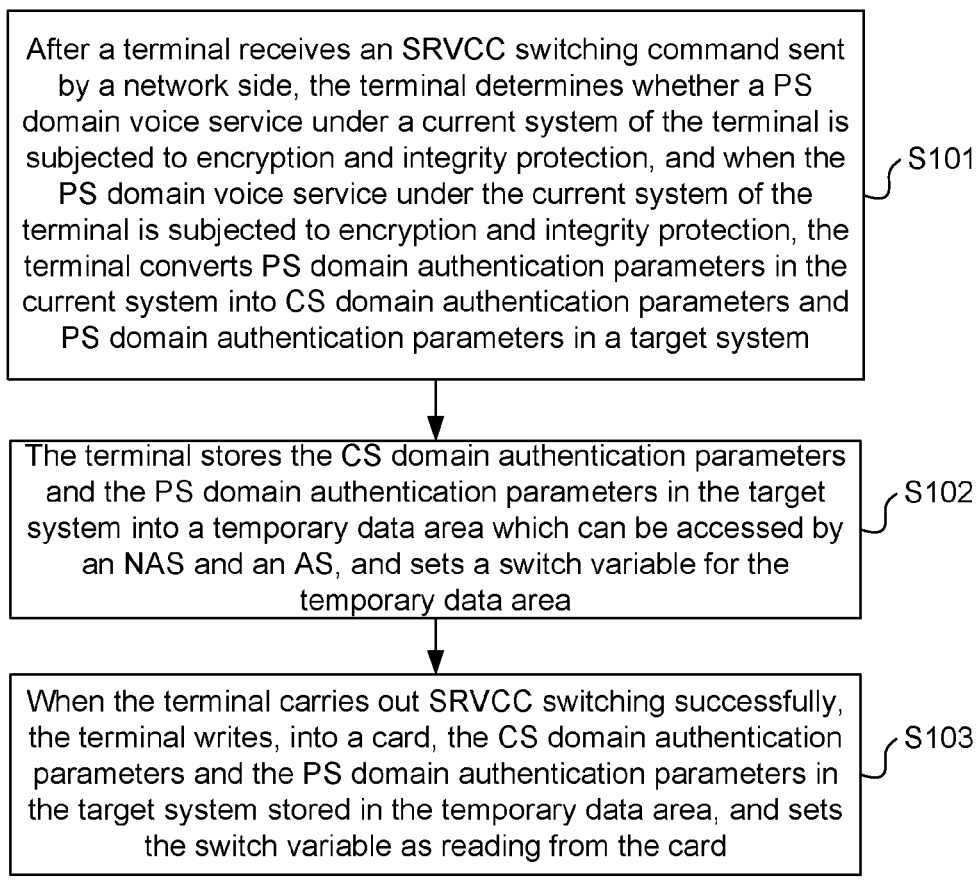
FIG. 1 is a flowchart of a method for processing SRVCC switching according to the disclosure.

As shown in FIG. 1, a method for processing SRVCC switching according to the disclosure includes the following steps.

Step 101: after a terminal receives an SRVCC switching command sent by a network side, the terminal determines whether a PS domain voice service under a current system of the terminal is subjected to encryption and integrity protection, and when the PS domain voice service under the current system of the terminal is subjected to encryption and integrity protection, the terminal converts PS domain authentication parameters in the current system into CS domain authentication parameters and PS domain authentication parameters in a target system.

Step 102: the CS domain authentication parameters and the PS domain authentication parameters in the target system are stored into a temporary data area which can be accessed by an NAS and an AS, and a switch variable is set for the temporary data area.

Step 103: when the terminal determines the SRVCC switching succeeds, the terminal writes, into a card, the CS domain authentication parameters and the PS domain authentication parameters in the target system stored in the temporary data area, and sets the switch variable as reading from the card.

In Step 101, when the SRVCC switching is performed on the terminal, the current system of the terminal may be LTE or TD-SCDMA system, and the target system of the terminal may be TD-SCDMA or GSM system. For example, when it is switched from the current LTE system to the TD-SCDMA or GSM system for the SRVCC of the terminal, the process of converting PS domain authentication parameters in the current LTE system into CS domain authentication parameters and PS domain authentication parameters in the TD-SCDMA or GSM system includes that:

(1) the card is read to receive an Access Security Management Entity of Key (KASME), a downlink NAS COUNT value and a Key Set Identifier for E-UTRAN (eKsi) in the LTE system, (2) an IK and a Ck are calculated, (3) a Kc of 64 bits is calculated according to the calculated IK and Ck, (4) a Kc of 128 bits is calculated according to the calculated IK and Ck, (5) a NewFlag used for indicating whether the calculated keys are new keys is set as invalid, and (6) a CKSN and a KSI are set as the eKsi in the LTE system.

In another example, when it is switched from the current TD-SCDMA system to the TD-SCDMA or GSM system for the SRVCC of the terminal, the process of converting PS domain authentication parameters in the current TD-SCDMA system into CS domain authentication parameters in the TD-SCDMA system or into CS domain authentication parameters and PS domain authentication parameters in the GSM system includes that:

(1) an IK and a Ck are calculated, (2) a Kc of 64 bits is calculated according to the calculated IK and Ck, (3) a Kc of 128 bits is calculated according to the calculated IK and Ck, (4) a NewFlag is set as invalid, and (5) a CKSN and a KSI are set as a PS domain KSI in the current TD-SCDMA system.

Figure 2:
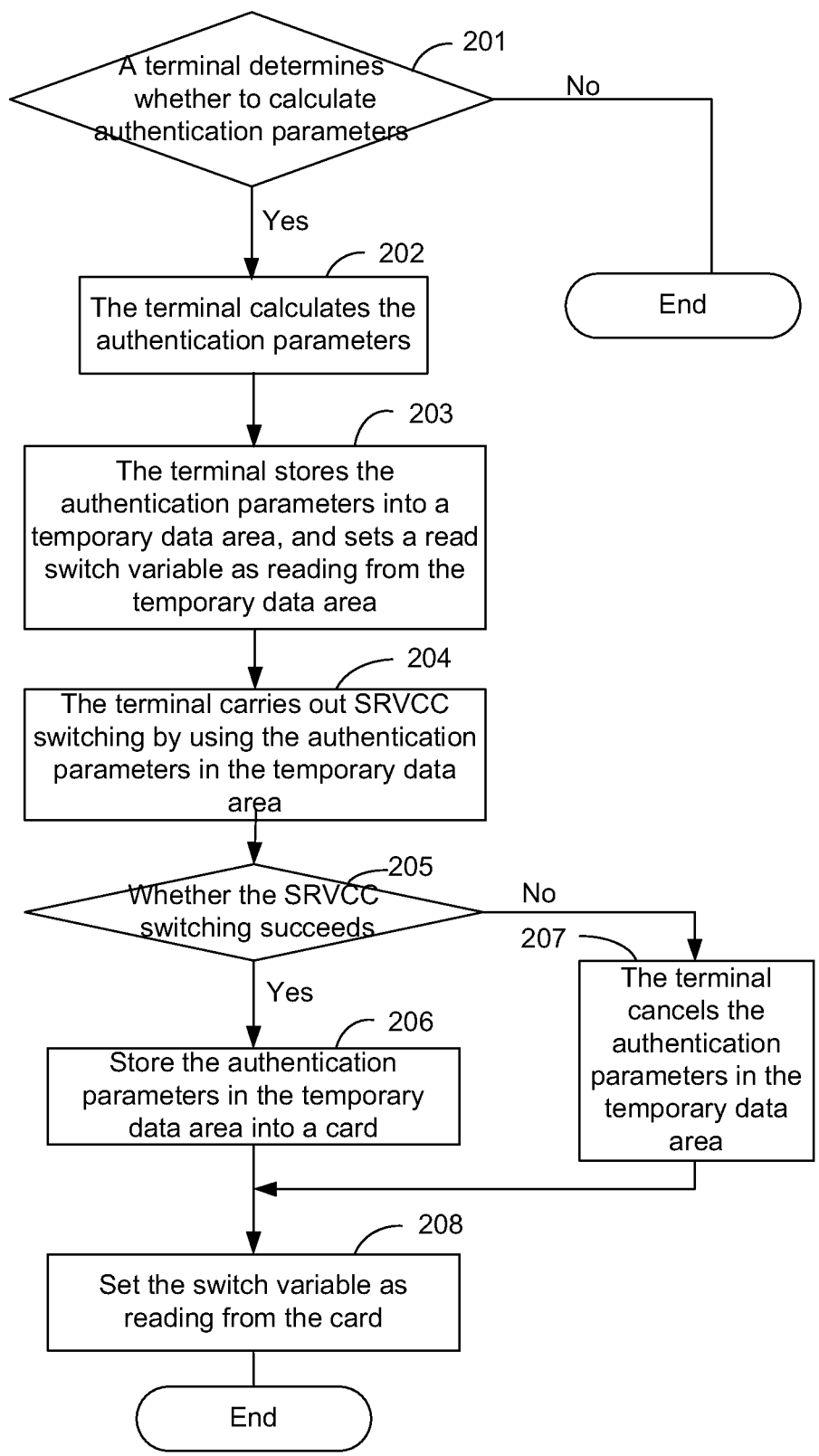
FIG. 2 is a flowchart of a method for processing SRVCC switching according to an embodiment of the disclosure.

Referring to FIG. 2, FIG. 2 is a flowchart of a method for processing SRVCC switching according to an embodiment of the disclosure. The method may mainly include the following steps.

Step 201: a terminal determines whether to calculate authentication parameters. If authentication parameters need to be calculated, Step 202 is executed. If no authentication parameters need to be calculated, the current flow ends.

Step 202: the terminal calculates the authentication parameters with reference to the following second step.

Step 203: the terminal stores the authentication parameters into a temporary data area, and sets a read switch variable as reading from the temporary data area.

Step 204: the terminal carries out SRVCC switching by using the authentication parameters in the temporary data area.

Step 205: it is determined whether the SRVCC switching succeeds. If the SRVCC switching succeeds, Step 206 is executed. If the SRVCC switching fails, Step 207 is executed.

Step 206: the terminal stores the authentication parameters in the temporary data area into a card, and Step 208 is executed.

Step 207: the terminal cancels the authentication parameters in the temporary data area, and Step 208 is executed.

Step 208: the terminal sets the switch variable as reading from the card, and the current flow ends.

During the process of communications, an encryption key and an integrity protection key are generated by the card through calculation and stored in the card, and the encryption key or the integrity protection key is obtained from the card when there is a need for encryption or integrity protection. The flow of the method for processing SRVCC switching according to the embodiment of the disclosure includes the following steps.

First step: if a PS domain voice service is an emergency voice service, then the PS domain voice service may not be subjected to integrity protection. In view of this situation, the terminal needs not to calculate the authentication parameters in the case of SRVCC switching.

Second step: when a voice service under the current system is subjected to encryption and integrity protection, it needs to calculate CS domain authentication parameters and PS domain authentication parameters in a target system according to PS domain authentication parameters in the current system. The calculation process is as follows.

In one case, when it is switched from the LTE system to the TD-SCDMA or GSM system for the SRVCC of the terminal, a) The card is read to receive a KASME, a downlink NAS COUNT value and an eKsi in the LTE system. The downlink NAS COUNT value is a value of a counter used for counting NAS messages from a Mobile Management Entity (MME) and from a terminal, which value would be used at the time of integrity protection.

b) An IK and a Ck are calculated, where a specific calculation formula is derived key=HMAC-SHA-256 (Key, S) with reference to 33.220 B2 of the 3GPP protocol. For the input parameters, it can be referred to the 33.041 A.12 of the 3GPP protocol. HMAC-SHA-256 is a Hash encryption algorithm, with the parameters Key and S. The derived key is an encryption key calculated by the Hash encryption algorithm. A Hash Message Authentication Code (HMAC) Algorithm and a Secure Hash Algorithm (SHA) are a series of cryptographic Hash functions which are designed by the U.S. National Security Agency and published by the U.S. National Institute of Standards and Technology (NIST).

Please refer to 33.220 B2 of the 3GPP protocol for the details of these algorithms, which are not repeated here. In the aforementioned mathematical formula, S=FC||P0||L0||P1||L1||P2||L2||P3||L3|| . . . ||Pn||Ln;

FC=0x1A;
P0=downlink NAS COUNT value;
L0=length of downlink NAS COUNT value (i.e. 0x00 0x04);
K=KASME;
derived key=CK||IK, Please refer to the 33.041 A.12 of the 3GPP protocol for the values of these parameters.

c) A Kc of 64 bits is calculated according to the calculated IK and Ck, by means of the C3 algorithm (6.8.1.2 of 33.102 of the 3GPP protocol).

After the IK and Ck are calculated according to the above step b), a Kc of 64 bits is calculated by means of the C3 algorithm according to the calculated IK and Ck. Please refer to 33.102 of the 3GPP protocol for the specific calculating method.

C3: Kc=CK1 xor CK2 xor IK1 xor IK2;

CK=CK1||CK2;

IK=IK1||K2, where the CK1, CK2, Ik1 and Ik2 are of 64 bits respectively.

d) A Kc of 128 bits is calculated according to the calculated IK and Ck, please refer to 33.102 B.5 of the 3GPP protocol for specific parameter setting, and a specific calculation formula is derived key=HMAC-SHA-256 (Key, S) with reference to 33.220 B2 of the 3GPP protocol.

The calculation of the Kc of 128 bits is performed by means of the HMAC-SHA-256 algorithm with reference to a corresponding method in 33.102 B.5 of the 3GPP protocol.

FC=0x32;

K=CK||IK;

derived key=Kc of 128 bits;
No input parameters (Pi, Li).

e) A NewFlag is set as invalid, whether the NewFlag is used for indicating whether the calculated keys are new keys, and will be used in the TD-SCDMA system.

f) A CKSN and a KSI are set as an eKsi.

In another example, when it is switched from the TD-SCDMA system to the TD-SCDMA or GSM system for the SRVCC of the terminal, a specific calculation method is as follows.

a) An IK and a Ck are calculated by means of the formula derived key=HMAC-SHA-256 (Key, S) with reference to 33.220 B2 of the 3GPP protocol. For the input parameters, please refer to 33.102 B.3 of the 3GPP protocol (a Nounce value).

b) A Kc of 64 bits is calculated according to the calculated IK and Ck. For the used specific algorithm, please refer to the C3 algorithm (6.8.1.2 of 33.102 of the 3GPP protocol).

c) A Kc of 128 bits is calculated according to the calculated IK and Ck. For specific parameter setting, please refer to 33.102 B.5 of the 3GPP protocol, and a specific calculation formula is derived key=HMAC-SHA-256 (Key, S) with reference to 33.220 B2 of the 3GPP protocol.

d) A NewFlag is set as invalid.

e) A CKSN and a KSI are set as a PS domain KSI.

Third step: after authentication parameters in a target system are calculated, the authentication parameters in the target system need not be stored into a card but are temporarily stored into a memory area which can be accessed by the NAS and the AS, and a switch variable is set, so that a temporary data area can be accessed by an access interface on the AS, and a read switch is set by the NAS for the interface without modification to the interface when the AS accesses the temporary data area.

Fourth step: if the SRVCC switching succeeds, the NAS is responsible for writing the authentication parameters stored in the temporary data area into the card, and setting the switch variable as reading from the card. If the SRVCC switching fails, the authentication parameters may not be written into the card, instead, the authentication parameters stored in the temporary data area are cancelled, and the switch variable is set as reading from the card.

Through the above steps, authentication processing and signalling interaction over an air interface may be reduced during the process of going back to the original system or switching to the target system.

Figure 3:
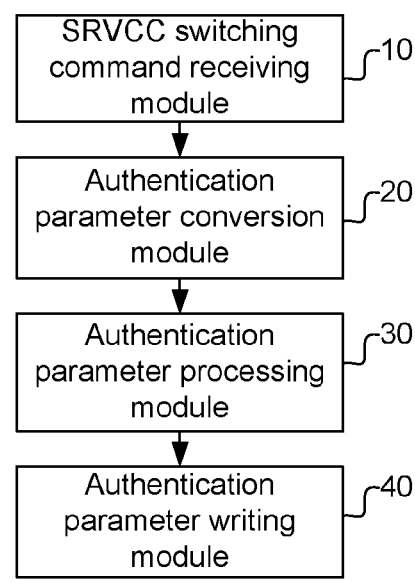
FIG. 3 is a structural diagram of a device for processing SRVCC switching according to the disclosure.

The disclosure further provides a device for processing SRVCC switching. As shown in FIG. 3, the device for processing SRVCC switching includes:

an SRVCC switching command receiving module 10, configured to receive an SRVCC switching command sent by a network side, an authentication parameter conversion module 20, configured to: determine whether a PS domain voice service under a current system of the device is subjected to encryption and integrity protection, and when the PS domain voice service under the current system of the device is subjected to encryption and integrity protection, convert PS domain authentication parameters in the current system into CS domain authentication parameters and PS domain authentication parameters in a target system, an authentication parameter processing module 30, configured to: store the CS domain authentication parameters and the PS domain authentication parameters in the target system into a temporary data area which can be accessed by an NAS and an AS, and set a switch variable for the temporary data area, and an authentication parameter writing module 40, configured to: when the terminal carries out SRVCC switching successfully, write, into a card, the CS domain authentication parameters and the PS domain authentication parameters in the target system stored in the temporary data area, and set the switch variable as reading from the card.

When the SRVCC switching is performed, the current system may be the LTE or TD-SCDMA system and the target system may is the TD-SCDMA or GSM system. For example, when the device is switched to from an LTE system to a TD-SCDMA or GSM system by terms of an SRVCC switching mode, the authentication parameter processing module may specifically be configured to:

read the card to receive a KASME, a downlink NAS COUNT value and an eKsi in the LTE system, calculate an IK and a Ck by a calculation formula derived key=HMAC-SHA-256 (Key, S), calculate a GSM ciphering key (Kc) of 64 bits according to the calculated IK and Ck, calculate a Kc of 128 bits according to the calculated IK and Ck, set a NewFlag used for indicating whether the calculated keys are new keys, as invalid, and set a CKSN and a KSI as the eKsi in the LTE system.

For another example, when the device is switched to from a TD-SCDMA system to a TD-SCDMA or GSM system by terms of an SRVCC switching mode, the authentication parameter processing module may specifically configured to:

calculate an IK and a Ck by a calculation formula derived key=HMAC-SHA-256 (Key, S), calculate a Kc of 64 bits according to the calculated IK and Ck, calculate a Kc of 128 bits by a calculation formula derived key=HMAC-SHA-256 (Key, S) according to the calculated IK and Ck, set a NewFlag as invalid, and set a CKSN and a KSI as a PS domain KSI in the current TD-SCDMA system.

An embodiment of the disclosure further provides a terminal, which includes the aforementioned device for processing SRVCC switching. Referring to FIG. 3, the device for processing SRVCC switching includes:

an SRVCC switching command receiving module 10, configured to receive an SRVCC switching command sent by a network side, an authentication parameter conversion module 20, configured to: determine whether a PS domain voice service under a current system of the terminal is subjected to encryption and integrity protection, and when the PS domain voice service under the current system of the terminal is subjected to encryption and integrity protection, convert PS domain authentication parameters in the current system into CS domain authentication parameters and PS domain authentication parameters in a target system, an authentication parameter processing module 30, configured to: store the CS domain authentication parameters and the PS domain authentication parameters in the target system into a temporary data area which can be accessed by an NAS and an AS, and set a switch variable for the temporary data area, and an authentication parameter writing module 40, configured to: when the terminal carries out SRVCC switching successfully, write, into a card, the CS domain authentication parameters and the PS domain authentication parameters in the target system stored in the temporary data area, and set the switch variable as reading from the card.

When the terminal is switched to from an LTE system to a TD-SCDMA or GSM system by terms of an SRVCC switching mode, the authentication parameter processing module may specifically be configured to:

read the card to receive a KASME, a downlink NAS COUNT value and an eKsi in the LTE system, calculate an IK and a Ck by a calculation formula derived key=HMAC-SHA-256 (Key, S), calculate a GSM ciphering key (Kc) of 64 bits according to the calculated IK and Ck, calculate a Kc of 128 bits according to the calculated IK and Ck, set a NewFlag used for indicating whether the calculated keys are new keys, as invalid, and set a CKSN and a KSI as the eKsi in the LTE system.

Alternatively, when the terminal is switched to from a TD-SCDMA system to a TD-SCDMA or GSM system by terms of an SRVCC switching mode, the authentication parameter processing module may specifically configured to:

calculate an IK and a Ck by a calculation formula derived key=HMAC-SHA-256 (Key, S), calculate a Kc of 64 bits according to the calculated IK and Ck, calculate a Kc of 128 bits by a calculation formula derived key=HMAC-SHA-256 (Key, S) according to the calculated IK and Ck, set a NewFlag as invalid, and set a CKSN and a KSI as a PS domain KSI in the current TD-SCDMA system.

The terminal provided by the disclosure can store two sets of authentication parameters during the process of SRVCC switching, one set of which is stored into a card and the other set is stored into a temporary data area, and specific access to the authentication parameters is controlled by a switch variable so that a user does not need to consider using which data area. It is determined, only after the SRVCC switching succeeds or fails, whether authentication parameters in the temporary data area need to be written into the card. Calculated authentication parameters are directly written into the card after the SRVCC switching is started, so that update of the authentication parameters is more flexible and signalling interaction with a network can be reduced.

The foregoing description illustrates and describes the preferable embodiments of the disclosure. However, as previously mentioned, it should be understood that the disclosure is not restricted to the form disclosed by the present document and should not be regarded as exclusion of other embodiments, but can be used to various other combinations, modifications and environments and can be modified according to the above teaching or technologies or knowledge of related fields within the scope of conception of the disclosure described in the present document. Furthermore, modifications and changes made by those skilled in the art without departing from the spirit and principle of the disclosure shall fall within the scope of protection of the claims of the disclosure.

The invention claimed is:

1. A method for processing Single Radio Voice Call Continuity (SRVCC) switching, comprising:

after a terminal receives an SRVCC switching command sent by a network side, determining, by the terminal, whether a Packet Switching (PS) domain voice service under a current system of the terminal is subjected to encryption and integrity protection;

when the PS domain voice service under the current system of the terminal is subjected to encryption and integrity protection, converting PS domain authentication parameters in the current system into Circuit Switching (CS) domain authentication parameters and PS domain authentication parameters in a target system;

storing, the CS domain authentication parameters and the PS domain authentication parameters in the target system into a temporary data area which can be accessed by a Non-Access Stratus (NAS) and an Access Stratus (AS), and setting a switch variable for the temporary data area; and when the terminal determines that the SRVCC switching succeeds, writing, into a card, the CS domain authentication parameters and the PS domain authentication parameters in the target system stored in the temporary data area, and setting the switch variable as reading from the card.

2. The method according to claim 1, wherein when the terminal is switched from an LTE system to a Time Division-Synchronization Code Division Multiple Access (TD-SCDMA) or Global System for Mobile Communications (GSM) system by terms of an SRVCC switching mode, the step of converting PS domain authentication parameters in the current LTE system into CS domain authentication parameters and PS domain authentication parameters in the TD-SCDMA or GSM system comprises:
  reading the card to receive an Access Security Management Entity of Key (KASME), a downlink NAS COUNT value and a Key Set Identifier for E-UTRAN (eKsi) in the LTE system;
  calculating a Universal Mobile Telecommunications System (UMTS) integrity key (IK) and a UMTS ciphering key (Ck);
  calculating a GSM ciphering key (Kc) of 64 bits according to the calculated IK and Ck;
  calculating a Kc of 128 bits according to the calculated IK and Ck;
  setting a NewFlag used for indicating whether the calculated keys are new keys, as invalid; and
  setting a UMTS ciphering key sequence number (CKSN) and a GSM key set identifier (KSI) as the eKsi in the LTE system.

3. The method according to claim 1, wherein when the terminal is switched from a TD-SCDMA system to a TD-SCDMA or GSM system by terms of an SRVCC switching mode, the step of converting PS domain authentication parameters in the current TD-SCDMA system into CS domain authentication parameters in the TD-SCDMA system or into CS domain authentication parameters and PS domain authentication parameters in the GSM system comprises:
  calculating an IK and a Ck;
  calculating a Kc of 64 bits according to the calculated IK and Ck;
  calculating a Kc of 128 bits according to the calculated IK and Ck;
  setting a NewFlag as invalid; and
  setting a CKSN and a KSI as a PS domain KSI in the current TD-SCDMA system.

4. A device for processing Single Radio Voice Call Continuity (SRVCC) switching, comprising:
  an SRVCC switching command receiving module, configured to receive an SRVCC switching command sent by a network side;
  an authentication parameter conversion module, configured to: determine whether a Packet Switching (PS) domain voice service under a current system of the device is subjected to encryption and integrity protection, and when the PS domain voice service under the current system of the device is subjected to encryption and integrity protection, convert PS domain authentication parameters in the current system into Circuit Switching (CS) domain authentication parameters and PS domain authentication parameters in a target system;
  an authentication parameter processing module, configured to: store the CS domain authentication parameters and the PS domain authentication parameters in the target system into a temporary data area which can be accessed by a Non-Access Stratus (NAS) and an Access Stratus (AS), and set a switch variable for the temporary data area; and
  an authentication parameter writing module, configured to: when the terminal carries out SRVCC switching successfully, write, into a card, the CS domain authentication parameters and the PS domain authentication parameters in the target system stored in the temporary data area, and set the switch variable as reading from the card.

5. The device according to claim 4, wherein when the device is switched to from an LTE system to a Time Division-Synchronization Code Division Multiple Access (TD-SCDMA) or Global System for Mobile Communications (GSM) system by terms of an SRVCC switching mode, the authentication parameter processing module is further configured to:
  read the card to receive an Access Security Management Entity of Key (KASME), a downlink NAS COUNT value and a Key Set Identifier for E-UTRAN (eKsi) in the LTE system;
  calculate a Universal Mobile Telecommunications System (UMTS) integrity key (IK) and a UMTS ciphering key (Ck);
  calculate a GSM ciphering key (Kc) of 64 bits according to the calculated IK and Ck;
  calculate a Kc of 128 bits according to the calculated IK and Ck;
  set a NewFlag used for indicating whether the calculated keys are new keys, as invalid; and
  set a UMTS ciphering key sequence number (CKSN) and a GSM key set identifier (KSI) as the eKsi in the LTE system.

6. The device according to claim 4, wherein when the device is switched to from a TD-SCDMA system to a TD-SCDMA or GSM system by terms of an SRVCC switching mode, the authentication parameter processing module is further configured to:
  calculate an IK and a Ck;
  calculate a Kc of 64 bits according to the calculated IK and Ck;
  calculate a Kc of 128 bits according to the calculated IK and Ck;
  set a NewFlag as invalid; and
  set a CKSN and a KSI as a PS domain KSI in the current TD-SCDMA system.

7. A terminal, comprising: a device for processing Single Radio Voice Call Continuity (SRVCC) switching, which comprises:
  an SRVCC switching command receiving module, configured to receive an SRVCC switching command sent by a network side;
  an authentication parameter conversion module, configured to: determine whether a Packet Switching (PS) domain voice service under a current system of the terminal is subjected to encryption and integrity protection, and when the PS domain voice service under the current system of the terminal is subjected to encryption and integrity protection, convert PS domain authentication parameters in the current system into Circuit Switching (CS) domain authentication parameters and PS domain authentication parameters in a target system;
  an authentication parameter processing module, configured to: store the CS domain authentication parameters and the PS domain authentication parameters in the target system into a temporary data area which can be accessed by a Non-Access Stratus (NAS) and an Access Stratus (AS), and set a switch variable for the temporary data area; and
  an authentication parameter writing module, configured to: when the terminal carries out SRVCC switching successfully, write, into a card, the CS domain authentication parameters and the PS domain authentication parameters in the target system stored in the temporary data area, and set the switch variable as reading from the card.

8. The terminal according to claim 7, wherein when the terminal is switched to from an LTE system to a Time Division-Synchronization Code Division Multiple Access (TD-SCDMA) or Global System for Mobile Communications (GSM) system by terms of an SRVCC switching mode, the authentication parameter processing module is further configured to:
  read the card to receive an Access Security Management Entity of Key (KASME), a downlink NAS COUNT value and a Key Set Identifier for E-UTRAN (eKsi) in the LTE system;
  calculate a Universal Mobile Telecommunications System (UMTS) integrity key (1K) and a UMTS ciphering key (Ck) by using a formula derived key=HMAC-SHA-256 (Key, S);
  calculate a GSM ciphering key (Kc) of 64 bits according to the calculated IK and Ck;
  calculate a Kc of 128 bits according to the calculated IK and Ck;
  set a NewFlag used for indicating whether the calculated keys are new keys, as invalid; and
  set a UMTS ciphering key sequence number (CKSN) and a GSM key set identifier (KSI) as the eKsi in the LTE system.

9. The terminal according to claim 7, wherein when the terminal is switched to from a TD-SCDMA system to a TD-SCDMA or GSM system by terms of an SRVCC switching mode, the authentication parameter processing module is further configured to:
  calculate an IK and a Ck;
  calculate a Kc of 64 bits according to the calculated IK and Ck;
  calculate a Kc of 128 bits according to the calculated IK and Ck;
  set a NewFlag as invalid; and
  set a CKSN and a KSI as a PS domain KSI in the current TD-SCDMA system.

* * * * *